G. W. Wood,
Hair Crimper.
N° 76,683.   Patented Apr. 14, 1868.
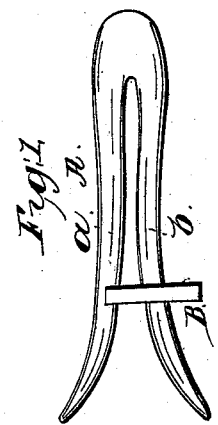
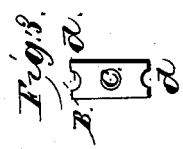
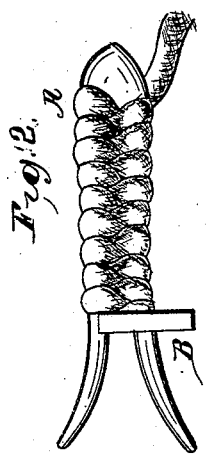
Witnesses:
Inventor:
George W. Wood,
per Francis D. Pastorius
Attorney.

United States Patent Office.

GEORGE W. WOOD, OF PHILADELPHIA, PENNSYLVANIA.

*Letters Patent No. 76,683, dated April 14, 1868.*

IMPROVEMENT IN HAIR-CRIMPERS.

*The Schedule referred to in these Letters Patent and making part of the same.*

TO ALL WHOM IT MAY CONCERN:

Be it known that I, GEORGE W. WOOD, of the city of Philadelphia, and State of Pennsylvania, have invented a new and improved Hair-Crimper; and I do hereby declare that the following is a full, clear, and exact description of the same, reference being had to the accompanying sheet of drawings, and to the letters of reference marked thereon.

My invention consists of a two-tined hair-crimper, with outwardly-curving ends to allow of the tines being closer together, to form a more even and natural crimp, and without unnecessarily perplexing the operation of crimping. It also consists of an expanding-slide and fastening, which is rectangular in shape, and, in this instance, is made of rubber, (though I do not confine myself to form and material,) and has an opening at or near its diagonal centre, and also has notches or indentations formed oppositely in its ends, so that when one of the tines is inserted into the central opening, the other takes into either of the end notches; and, on the slide being moved towards the head of the crimper, it presses against the interwoven hair on the tines, holding it together, fastening the loose end of it, and forcing the tines apart, whereby the hair is stretched, and the operation of crimping made more certain.

On reference to the accompanying sheet of drawings, making part of this specification—

Figure 1 is a view of the improved hair-crimper.

Figure 2 is a view of the same, with the hair on on it, and

Figure 3 is a view of the expanding-slide and holder, by which the tines or prongs of the hair-crimper are forced apart, whereby the interwoven hair is tightened on the tines, and the loose end of the tress held from slipping.

Similar letters refer to similar parts in the two views.

The hair-crimper A consists of two tines or prongs, $a$ and $b$, having outwardly-curving ends, on which the hair is crimped or ruffled, as follows: A tress of moistened hair is first passed between the tines or prongs in the bend or fork, the crimper being held close to the head, and is alternately passed up through, over, and under the tines until the whole tress is interwoven on them. One of the tines is then inserted into the opening $c$, formed diagonally in the expanding-slide B. The other one takes into a notch, $d$, formed in one or both ends of it. When the slide is moved forward, it compresses the interwoven hair endways, fastens the loose end of the tress, and distends or wedges the tines apart, thereby stretching the hair tight on the tines, and making the operation of crimping more certain. The tines $a$ and $b$ are spread or formed with outwardly-curving ends in order to allow of their having as small as possible intervening space, merely sufficient to admit of the insertion of the tress of hair, so as to make the crimps as close as possible, and give to the hair a perfectly natural and wavy appearance. They are also made outwardly curving, to guide the tress while being inserted between the tines, and thus expedite the interweaving of the tress on them. If the tines were made perfectly straight and close together, it would be almost impossible to prevent them from entering and dividing the tress while being laced.

What I claim as my invention, and desire to secure by Letters Patent, is—

The two-tined hair-crimper A, with outwardly-curving ends, in combination with the expanding and fastening-slide B, as a new article of manufacture, substantially as shown.

In testimony whereof, I hereunto sign my name to this specification in presence of two subscribing witnesses.

GEORGE W. WOOD.

Witnesses:
FRANCIS D. PASTORIUS,
W. W. DOUGHERTY.